Sept. 16, 1947.   M. ANDERSON   2,427,541
BEARING CONSTRUCTION
Filed Sept. 6, 1944

Inventor:
Marshall Anderson,
by  Harry E. Dunlany
His Attorney.

Patented Sept. 16, 1947

2,427,541

UNITED STATES PATENT OFFICE 2,427,541

BEARING CONSTRUCTION

Marshall Anderson, Marblehead, Mass., assignor to General Electric Company, a corporation of New York Application September 6, 1944, Serial No. 552,876

8 Claims. (Cl. 308—187)

My invention relates to bearing constructions and in particular to oil lubricated antifriction bearings such as those used for rotatable shafts of dynamoelectric machines or the like.

An object of my invention is to provide an improved bearing construction.

Another object of my invention is to provide an improved antifriction bearing and lubricating arrangement.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
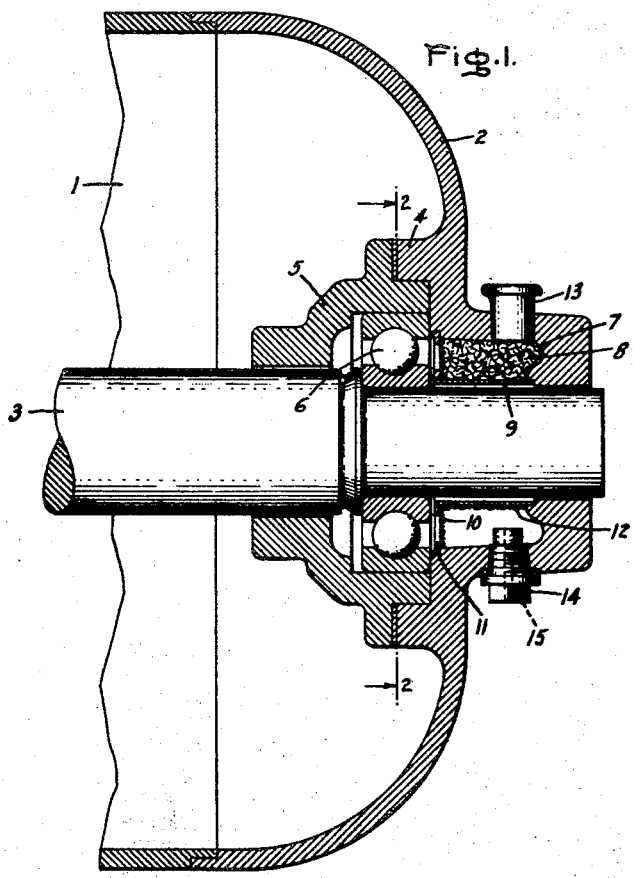
Figure 2:
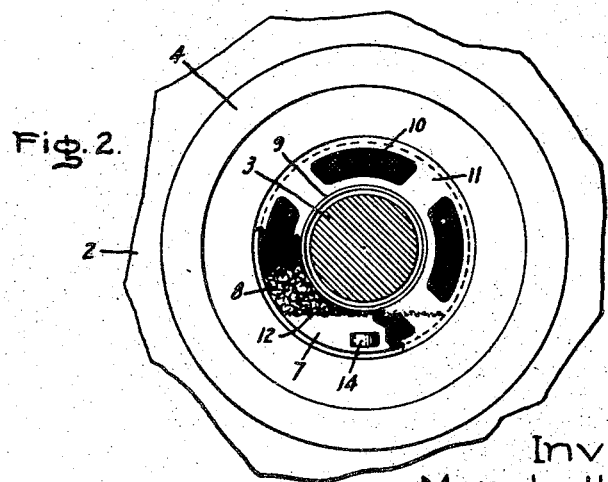

In the drawing, Fig. 1 is a side elevational view, partly in section, of a part of a dynamoelectric machine provided with an embodiment of my invention; and Fig. 2 is a view looking along line 2—2 of Fig. 1 with the bearing cap and bearing removed.

Referring to the drawing, I have shown an embodiment of my improved bearing construction in connection with a dynamoelectric machine having a stationary frame 1 and an end shield 2 adapted to support a bearing for supporting a rotatable shaft 3 on which the rotatable member of the machine is mounted. In this construction, the end shield 2 is formed with an inwardly extending circular flange 4 to which a bearing cap 5 is secured. An antifriction ball bearing 6 is mounted in the bearing cap 5 and is arranged to support the shaft 3. The bearing cap 5, the flange 4, and an outwardly extending lubricant supply chamber 7 form a bearing housing and lubricant supply reservoir for gradually feeding lubricating oil to the ball bearing 6 without flooding the bearing and without supplying an excessive amount of oil which might cause foaming. In the illustrated arrangement, this desired feeding of lubricating oil to the bearing is accomplished by providing a lubricating oil absorbent fibrous waste material 8 arranged within the chamber 7 and held out of contact with the shaft 3 by a wall formed by a cylindrical element 9 mounted in the interior of the chamber 7 and formed to provide for the passage of the shaft 3 therethrough. This waste material is held out of contact with the bearing 6 by a foraminous or perforated member forming passageways which permit the passage of oil from the chamber 7 to the bearing 6 and also provides for a return of this oil when the bearing is in operation. In this construction, the foraminous member comprises a screen retaining member 10 which is held in position by a spider washer 11. In order to facilitate the proper supply of oil to the ball bearing 6, another foraminous or perforated screen retaining member 12 is arranged across the lower portion of the chamber 7 to provide for retaining the absorbent waste material in the upper portion of the chamber and to provide a lubricating oil reservoir in the lower portion of the chamber. During normal operation, the lubricating oil in the chamber 7 may be replenished by supplying oil through an oil cup 13 which extends through the upper part of the chamber 7, and this lubricating oil will be fed to the bearing by gradual seepage from the waste material 8 into the reservoir formed in the bottom portion of the chamber 7 below the screen 12. Lubricating oil from the lubricating oil reservoir will then pass through the openings in the screen member 10 and in the spider washer 11 to the ball bearing 6. Rotation of the ball bearing 6 will cause any excess oil to be thrown off the bearing, and this will be reabsorbed by the absorbent waste material 8 in which it will be held in suspension until such time as it again has returned to the lubricating oil reservoir formed in the chamber 7 below the screen 12. In order further to insure against the supply of an excessive amount of lubricating oil to the bearing 6, I provide an adjustable overflow fitting 14 which is threaded into a complementary threaded opening in the lower part of the chamber 7. The fitting 14 is formed with an opening 15 therethrough which forms a communication between the lubricating oil reservoir and the exterior of the chamber 7 for regulating the maximum level of lubricating oil in the reservoir. Thus, if the level of the oil in the reservoir rises above the top of the fitting 14, this excessive oil will flow out of the reservoir through the opening 15. By adjustment of the position of the top of the fitting 14, the level of the oil in the lubricating oil reservoir can readily be regulated to the desired proper maximum level. In this manner, I provide an improved bearing construction adapted to be lubricated by oil and to which the rate of flow of lubricating oil may be regulated to prevent overheating of the bearing and to prevent foaming of the oil such as occurs if an antifriction bearing, such as a ball or roller bearing, is flood lubricated, or otherwise over-lubricated with oil.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A bearing construction including a bearing housing, an antifriction bearing in said housing adapted to support a rotatable shaft, means for supplying lubricating oil to said bearing including a chamber arranged axially adjacent said bearing, lubricating oil absorbent material in said chamber, and means including a foraminous member for retaining said lubricating oil absorbent material in said chamber out of contact with said bearing and for retaining said absorbent material out of a portion of said chamber forming a lubricating oil reservoir in the lower portion of said chamber and providing for passage of lubricating oil through said foraminous member to said bearing.

2. A bearing construction including a bearing housing, a ball bearing in said housing adapted to support a rotatable shaft, means including a chamber and lubricating oil absorbent material in said chamber for supplying lubricating oil to said bearing, means including a foraminous member for retaining said lubricating oil absorbent material in said chamber out of contact with said bearing and for providing passage of lubricating oil through said foraminous member between said bearing and said absorbent material, and means including a second foraminous member arranged to retain said absorbent material out of the lower portion of said chamber for forming a lubricating oil reservoir therein.

3. A bearing construction including a bearing housing, an antifriction bearing in said housing adapted to support a rotatable shaft, means including a chamber arranged axially adjacent said bearing and lubricating oil absorbent material in said chamber for supplying lubricating oil to said bearing, means including a foraminous member for retaining said lubricating oil absorbent material in said chamber out of contact with said bearing and for retaining said absorbent material out of a portion of said chamber forming a lubricating oil reservoir in the lower portion of said chamber and for providing for passage of lubricating oil through said foraminous member to said bearing, and means including an overflow fitting extending into said lubricating oil reservoir for regulating the maximum level of lubricating oil in said reservoir.

4. A bearing construction including a bearing housing, an antifriction bearing in said housing adapted to support a rotatable shaft, means for supplying lubricating oil to said bearing including a chamber and lubricating oil absorbent material in said chamber, means including a foraminous member for retaining said lubricating oil absorbent material in said chamber out of contact with said bearing and being arranged to form a lubricating oil reservoir in said chamber for collecting lubricating oil therein, said foraminous member being arranged to provide for passage of lubricating oil through said foraminous member and from said reservoir to said bearing between said absorbent material and said bearing, and means for regulating the maximum level of lubricating oil in said reservoir.

5. A bearing construction including a bearing housing, an antifriction bearing in said housing adapted to support a rotatable shaft, means for supplying lubricating oil to said bearing including a chamber arranged axially adjacent said bearing, lubricating oil absorbent material in said chamber, means including a foraminous member for retaining said lubricating oil absorbent material in said chamber out of contact with said bearing and being arranged to retain said absorbent material out of a part of said chamber forming a lubricating oil reservoir in the lower portion of said chamber for collecting lubricating oil therein, said foraminous member being arranged to provide for passage of lubricating oil through said foraminous member from said reservoir to said bearing and between said absorbent material and said bearing, and means for regulating the maximum level of lubricating oil in said reservoir.

6. A bearing construction including a bearing housing, an antifriction bearing in said housing adapted to support a rotatable shaft, means for supplying lubricating oil to said bearing including a chamber arranged axially adjacent said bearing, lubricating oil absorbent material in said chamber, means including a foraminous member for retaining said lubricating oil absorbent material in said chamber out of contact with said bearing and being arranged to form a lubricating oil reservoir in the lower portion of said chamber for collecting lubricating oil therein and providing for passage of lubricating oil through said foraminous member directly to said bearing from said reservoir and being arranged to provide for the passage of lubricating oil between said absorbent material and said bearing, means for supplying lubricating oil to said absorbent material in said chamber, and means including an overflow fitting extending into said lubricating oil reservoir for regulating the maximum level of lubricating oil in said reservoir.

7. A bearing construction for a dynamoelectric machine or the like including a bearing housing, an antifriction ball bearing in said housing adapted to support a rotatable shaft, means for supplying lubricating oil to said bearing including a chamber arranged axially adjacent said bearing, lubricating oil absorbent material in said chamber, means including a screen retainer and cooperating wall member for retaining said lubricating oil absorbent material in said chamber out of contact with said bearing, said screen retainer being arranged to form a lubricating oil reservoir in the lower portion of said chamber for collecting lubricating oil therein and providing for passage of lubricating oil through said screen retainer to said bearing from said reservoir and being arranged to provide for the passage of said lubricating oil between said absorbent material and said bearing, means for supplying lubricating oil to said absorbent material in said chamber, and means including an overflow fitting extending into said lubricating oil reservoir for regulating the maximum level of lubricating oil in said reservoir.

8. A bearing construction for a dynamoelectric machine or the like including a bearing housing, an antifriction ball bearing in said housing adapted to support a rotatable shaft, means for supplying lubricating oil to said bearing including a chamber arranged axially adjacent said bearing, means including a screen retainer and cooperating wall member for retaining lubricating oil absorbent fibrous waste material in said chamber out of contact with said bearing and providing for the passage of a shaft therethrough, lubricating oil absorbent fibrous waste material in said chamber, said screen retainer being arranged to retain said absorbent material out of the lower portion of said chamber forming a lubricating oil reservoir therein for collecting lubricating oil therein and for passage of lubricating oil through said screen retainer to said bearing from said reservoir and being arranged to permit the passage to said absorbent material of said lubricating oil thrown by said bearing during operation, means including an oil cup for supplying lubricating oil to said absorbent material in said chamber, and means including an adjustable overflow fitting extending into said lubricating oil reservoir and having an opening therethrough forming a communication between said lubricating oil reservoir and the exterior of said chamber for regulating the maximum level of lubricating oil in said reservoir.

MARSHALL ANDERSON.

REFERENCES CITED

The following references are of record in the file of this patent:

UNITED STATES PATENTS

| Number | Name | Date |
|---|---|---|
| 1,400,055 | Gysel | Dec. 13, 1921 |
| 1,667,807 | Johnson | May 1, 1928 |
| 947,529 | Meston | Jan. 25, 1910 |
| 1,724,902 | Bentley | Aug. 20, 1929 |
| 1,865,088 | Daun | June 28, 1932 |
| 2,037,074 | Griswold | Apr. 14, 1936 |
| 2,132,249 | Van Pelt | Oct. 4, 1938 |
| 2,170,036 | Schumann | Aug. 22, 1939 |
| 2,212,661 | Harper | Aug. 27, 1940 |
| 2,280,965 | Mueller | Apr. 28, 1942 |